(12) United States Patent
Hollis et al.

(10) Patent No.: US 10,278,494 B2
(45) Date of Patent: May 7, 2019

(54) SYSTEM FOR A COMBINATION FURNITURE AND DISPLAY UNIT

(71) Applicant: Furniture Values International, LLC, Phoenix, AZ (US)

(72) Inventors: Troy A. Hollis, Phoenix, AZ (US); Ben Lewis, Phoenix, AZ (US); Sam Panchit, Phoenix, AZ (US)

(73) Assignee: FURNITURE VALUES INTERNATIONAL, LLC, Phoenix, AZ (US)

( * ) Notice: Subject to any disclaimer, the term of this patent is extended or adjusted under 35 U.S.C. 154(b) by 0 days.

(21) Appl. No.: 15/283,845

(22) Filed: Oct. 3, 2016

(65) Prior Publication Data

US 2017/0127829 A1 May 11, 2017

Related U.S. Application Data

(60) Provisional application No. 62/236,646, filed on Oct. 2, 2015.

(51) Int. Cl.
*F16M 11/00* (2006.01)
*A47B 81/06* (2006.01)
*F16M 13/00* (2006.01)

(52) U.S. Cl.
CPC .......... *A47B 81/06* (2013.01); *F16M 11/00* (2013.01); *F16M 13/00* (2013.01)

(58) Field of Classification Search
CPC ............ Y10S 248/918; Y10S 248/917; G06F 1/1601; G06F 1/1637

USPC ................. 248/364, 910, 917, 918
See application file for complete search history.

(56) References Cited

U.S. PATENT DOCUMENTS

| | | | | |
|---|---|---|---|---|
| 6,352,226 B1 * | 3/2002 | Gordon | ............ | B64D 11/0015 248/125.2 |
| D480,237 S * | 10/2003 | de Carolis | ................. | D6/675.3 |
| 7,530,538 B2 * | 5/2009 | Whalen | ............... | A47B 81/061 108/50.01 |
| 7,740,218 B2 * | 6/2010 | Green | ................... | F16M 11/10 248/121 |
| 8,167,253 B2 * | 5/2012 | Smith | ................... | A47B 81/06 108/180 |
| 8,418,987 B2 * | 4/2013 | Kakuta | ................. | F16M 11/22 248/917 |
| 8,813,656 B1 * | 8/2014 | Hazzard | ................ | A47B 81/06 108/42 |
| 9,631,769 B2 * | 4/2017 | McGowan | ............ | H02G 7/205 |
| 2011/0079688 A1 * | 4/2011 | Grove | ................... | F16M 11/08 248/176.3 |

* cited by examiner

*Primary Examiner* — Steven M Marsh
(74) *Attorney, Agent, or Firm* — Squire Patton Boggs (US) LLP

(57) ABSTRACT

A system is delineated for mounting a provided television. The system includes a frame having a central aperture formed by an internal surface of the frame, wherein the aperture is sized to accommodate an outer perimeter of the provided television. The system also includes a casegood including a weighted region to minimize risk of tipping the system and means for coupling the frame to the casegood such that a front panel surface of the provided television when mounted within the frame is located in proximity to a rear edge of the casegood.

3 Claims, 3 Drawing Sheets

SYSTEM FOR A COMBINATION FURNITURE AND DISPLAY UNIT

CROSS-REFERENCE TO RELATED APPLICATION

This application is related to and claims the benefit and priority of U.S. Provisional Patent Application No. 62/236,646, which was filed Oct. 2, 2015, titled "STORAGE CASE, FLAT PANEL TV MOUNT," which is hereby incorporated herein by reference in its entirety.

BACKGROUND

Field

Embodiments of the present invention provide mounting systems, and more particularly, the systems mount a provided television to a casegood, without requiring mounting the provided television to a wall while maximizing use of the upper surface of the casegood.

Description of the Related Art

Many consumers would like to have a television in their bedroom without having to drill into their walls or have to take up valuable storage space on the top of their bedroom casegood. Standard television consoles don't offer the storage space required in a bedroom setting.

SUMMARY

According to certain embodiments, a system is delineated for mounting a provided television. The system includes a frame having a central aperture formed by an internal surface of the frame, wherein the aperture is sized to accommodate an outer perimeter of the provided television. The system also includes a casegood including a weighted region to minimize risk of tipping the system and means for coupling the frame to the casegood such that a front panel surface of the provided television when mounted within the frame is located in proximity to a rear edge of the casegood.

BRIEF DESCRIPTION OF THE DRAWINGS

For proper understanding of the invention, reference should be made to the accompanying drawings, wherein.

DETAILED DESCRIPTION

As stated above, many consumers would like to have a television in their bedroom without having to drill into their walls or have to take up valuable storage space on the top of their bedroom casegood. Embodiments of the present invention solve this problem.

A well-designed flat-panel TV mount incorporated into a bedroom casegood without the use of a television stand allows for minimal space usage and offers a mounting surface that doesn't require drilling into the walls of the home.

Embodiments of the present invention differ from what currently exists. Current available flat panel television mounts must be attached to a wall in the home or to a designated television stand/console. Embodiments of the present invention offer this type of function in a bedroom casegood but don't have to be drilled to a wall.

Figure 1:
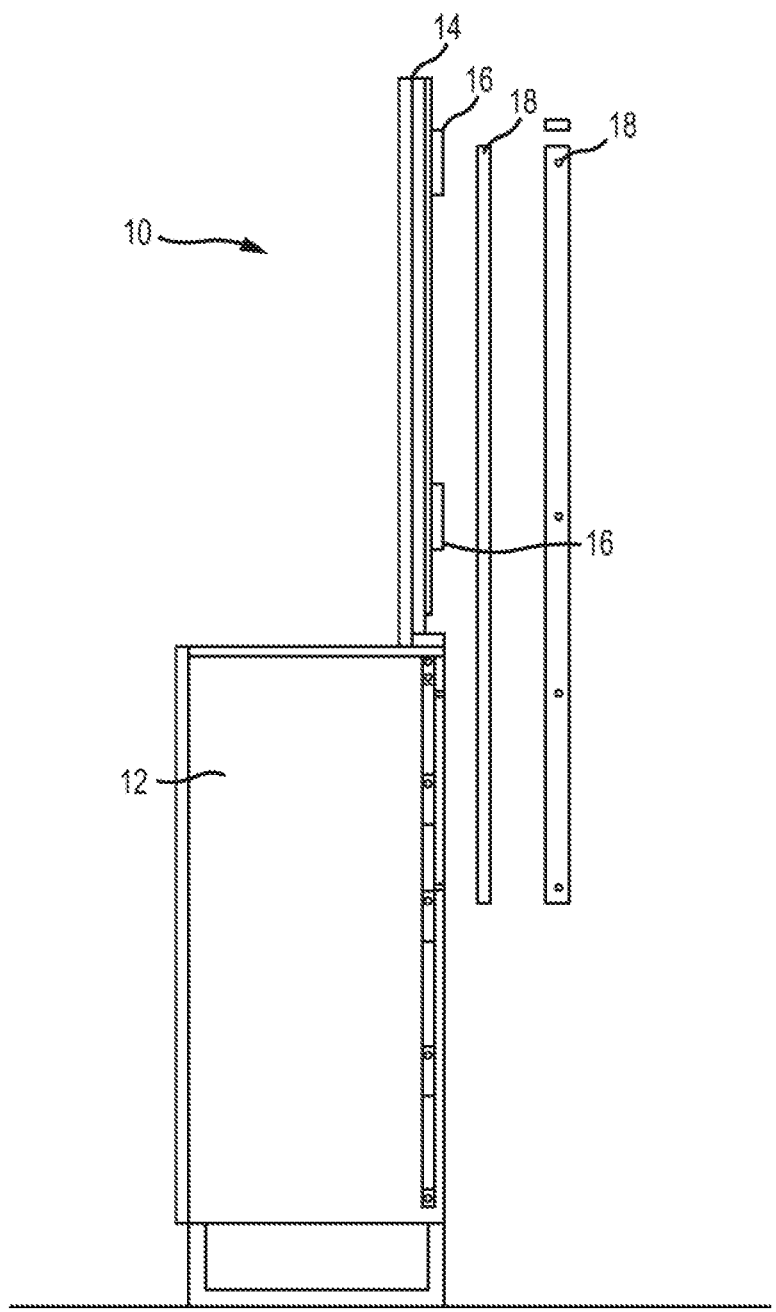
FIG. 1 a side cross-section, with parts broken away, of a system according to certain embodiments of the present invention.
Figure 2:
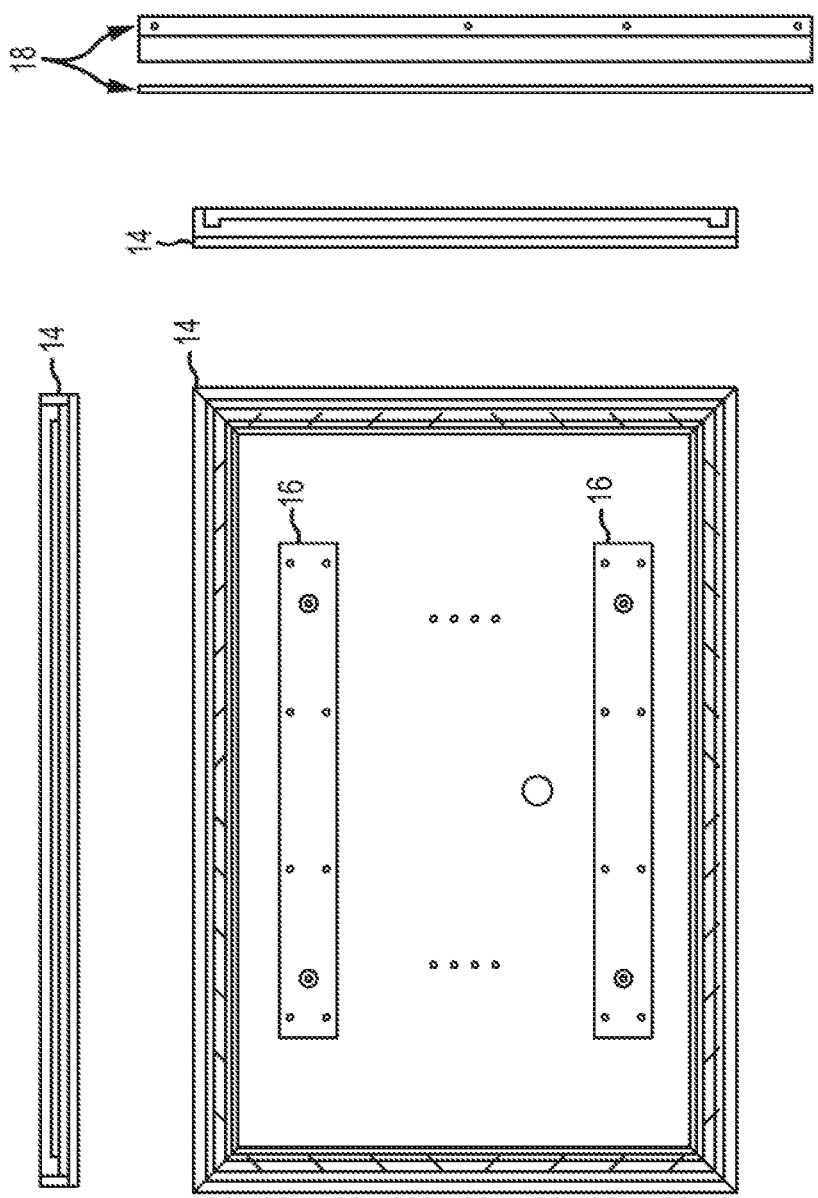
FIG. 2 illustrates at the top a Plan view of a frame for use with the system, a Front elevation, Side elevation, and two views of support structure for the system (Side and Front), according to certain embodiments of the present invention.
Figure 3:
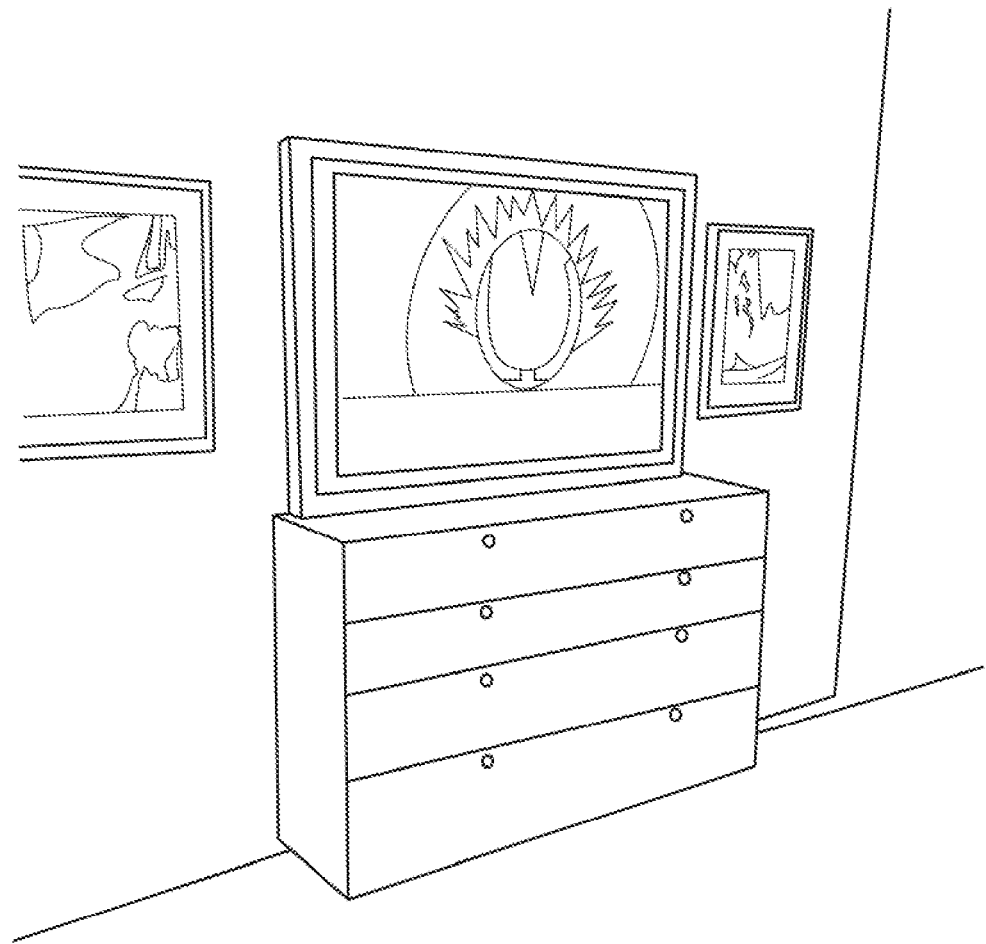
FIG. 3 is a perspective view of a system according to certain embodiments of the present invention, shown with a provided television.

Referring to FIG. 1, an exemplary embodiment of the present invention is depicted as system 10. System 10 may include a casegood 12 and a frame 14 including a central aperture to receive a mounted television (e.g., a flat panel television). Brackets 16 are permanently attached to a back of the frame 14 and support arms 18 may be coupled to the brackets 16 near one end of the support arms, while support arms 18 may be coupled to the casegood 12 near opposing ends of the support arms 18.

The frame 14 may be comprised of any desired material, such as Medium-Density Fiberboard (MDF) or hardwood. Holes may be pre-bored into frame 14 for adjustable mounting of the television.

Brackets 16 and support arms 18 are preferably made from sturdy material, such as metal, to accommodate the associated weight of the television and frame 14. The case good 12 may include a weighted back portion to minimize the risk of tipping system 10.

Embodiments of the present invention may support up to a 55" LCD TV on top of a storage case and hide all cables, wiring and TV supports.

To use embodiments of the present invention, one needs to mount the frame 14 to their casegood 12 using the brackets 16 and support arms 18. Then one would attach the metal television mount (provided) into their television. Then one would hang the television to the metal television mount that is attached to the framed panel 14.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A system for mounting a provided television, comprising:
    a frame including a central aperture formed by an internal surface of the frame, the aperture sized to accommodate an outer perimeter of the provided television;
    a casegood including a weighted region to minimize risk of tipping the system;
    means for coupling the frame to the casegood such that a front panel surface of the provided television when mounted within the frame is located in proximity to a rear edge of the casegood,
    wherein at least one portion of the means for coupling the frame to the casegood is mounted directly to and flush against a rear face of the casegood, and
    wherein at least a second portion of the means for coupling the frame to the casegood is mounted directly to the frame.

2. The system of claim 1 wherein the means for coupling includes a plurality of brackets.

3. The system of claim 2 wherein the means for coupling further includes a plurality of support arms.

* * * * *